(12) United States Patent
Guenthner et al.

(10) Patent No.: US 8,930,925 B2
(45) Date of Patent: Jan. 6, 2015

(54) METHOD FOR ENABLING COMPILATION OF A COBOL SOURCE PROGRAM UTILIZING A TWO-STAGE COMPILATION PROCESS, THE COBOL SOURCE PROGRAM INCLUDING A MIX OF COBOL, C++ OR JAVA STATEMENTS, AND OPTIONAL OPENMP DIRECTIVES

(71) Applicants: Russell Wayne Guenthner, Glendale, AZ (US); Todd Bradley Kneisel, Phoenix, AZ (US); Albert Henry John Wigchert, Phoenix, AZ (US); Clinton B. Eckard, McMinnville, TN (US)

(72) Inventors: Russell Wayne Guenthner, Glendale, AZ (US); Todd Bradley Kneisel, Phoenix, AZ (US); Albert Henry John Wigchert, Phoenix, AZ (US); Clinton B. Eckard, McMinnville, TN (US)

( * ) Notice: Subject to any disclaimer, the term of this patent is extended or adjusted under 35 U.S.C. 154(b) by 73 days.

(21) Appl. No.: 13/730,123

(22) Filed: Dec. 28, 2012

(65) Prior Publication Data
US 2014/0189664 A1 Jul. 3, 2014

(51) Int. Cl.
*G06F 9/45* (2006.01)
(52) U.S. Cl.
CPC ..................... *G06F 8/456* (2013.01)
USPC .......................................................... 717/146
(58) Field of Classification Search
CPC .................. G06F 8/41; G06F 8/456
USPC .................. 717/136–137, 140–144, 146–157
See application file for complete search history.

(56) References Cited

U.S. PATENT DOCUMENTS 6,453,464 B1 * 9/2002 Sullivan ......................... 717/137
8,645,932 B2 * 2/2014 Wright et al. .................. 717/146

OTHER PUBLICATIONS

IBM, "Enterprise COBOL for z/OS—Programming Guide" 2006, Version 3, Chapter 22, IBM Corp., pp. 411-416.*

* cited by examiner

*Primary Examiner* — Ted T Vo
(74) *Attorney, Agent, or Firm* — Russell W. Guenthner

(57) ABSTRACT

A method, apparatus, and program product are disclosed for carrying out the compilation of an original Cobol program that includes a mix of Cobol, C++ or JAVA and optional OpenMP directives in a single source program file so as to provide improved performance during execution of the program and improved convenience and features in programming. The approach or method includes performing a compilation (or translation) step utilizing a first compiler or translating program which is a is a specialized compiler/translator that takes as input a Cobol source program including a further provision for the inclusion of C/C++ program statements and OpenMP statements, and produces as output an intermediate computer program, the intermediate program that is entirely in C or C++, the intermediate program being intended for further compilation by an existing selected second compiler, the second compiler being an optimizing compiler that provides support for parallelism for the programs described in the C/C++ programming languages.

7 Claims, 5 Drawing Sheets

METHOD FOR ENABLING COMPILATION OF A COBOL SOURCE PROGRAM UTILIZING A TWO-STAGE COMPILATION PROCESS, THE COBOL SOURCE PROGRAM INCLUDING A MIX OF COBOL, C++ OR JAVA STATEMENTS, AND OPTIONAL OPENMP DIRECTIVES

CROSS REFERENCE TO RELATED APPLICATIONS

Continuation-in-part with reference to U.S. patent application Ser. No. 12/589,304 filed Oct. 20, 2009

Reference U.S. Provisional Application No. 61/459,227 filed Dec. 9, 2010

Reference U.S. Application No. 61/459,227 filed Dec. 7, 2011

This application claims priority to and is a continuation-in-part of U.S. patent application Ser. No. 12/589,304 filed on Oct. 20, 2009, the disclosure of which is hereby incorporated herein by reference in full and in its entirety as part of this specification. All other referenced patents and applications are also incorporated herein by reference in their entirety. Furthermore, where a definition or use of a term in a reference, which is incorporated by reference herein, is inconsistent or contrary to the definition of that term provided herein, the definition of that term provided herein shall govern the meaning of such term.

STATEMENT REGARDING FEDERALLY SPONSORED RESEARCH OR DEVELOPMENT

None

THE NAMES OF PARTIES TO A JOINT RESEARCH AGREEMENT

None

INCORPORATION-BY-REFERENCE OF MATERIAL SUBMITTED ON A COMPACT DISC

None

BACKGROUND OF THE INVENTION

1. Field of the Invention

This invention is related to the fields of: computing machines; parallel processing; parallel computing; multiple thread program execution; the computer language Cobol; the computer languages JAVA, C/C++ and Fortran; computer program compilers; computer languages, and other closely related computer art.

2. Description of the Related Art

The Cobol language may be considered a less popular and probably a less "modern" language than the "C", "C++", or "JAVA" languages. Compilers for the more "modern" languages are under constant development and improvement by several large companies and in the open source community and these compilers are available for a wide variety of computing hardware platforms. Although the Cobol language is by no means "dead", Cobol compilers are not currently under active development in the computer industry and the optimization of machine code for programs written in Cobol may not be as advanced or as good as optimizations produced for the other above mentioned languages.

The Cobol language is also sometimes regarded as being too "verbose" and some programmers do not like to use it in development of new programs.

Another problem is that the Cobol language is often not well known by many programmers who are more accustomed to using "C", "C++" or "JAVA". The Cobol language is not taught in some colleges or universities, even those that may specialize in computer science, and so a newly educated person in the programming industry may not be trained in Cobol.

Compilers for programs written in the Cobol language may also be less portable or not as well maintained in comparison to compilers for programs written in C, C++ or JAVA. This is because the generation of machine instructions by a compiler for a variety of hardware platforms requires customization of the generated code for each hardware platform, and writing compiler code generators to produce code for alternative platforms may not be worth the investment in time and effort for the companies which provide Cobol compilers.

In general, the Cobol language may also be viewed as not having "kept up with the times" in terms of providing certain features for advance programming concepts, although Cobol is widely used and standardization efforts continue. For example, the Cobol language and its known compilers do not include support for parallelization using the OpenMP standard which is provided for Fortran and C/C++ compilers. (OpenMP description can be found online at OpenMP.org and on the website the standard is described as a "defacto standard". OpenMP 3.1 specification was released in July 2011 in PDF form on this website).

One prior art approach that has been used to overcome or for partially overcoming one or more of the above such problems is by the development of a Cobol compiler called "OpenCobol", which has also been used as a basis for a more commercialized Cobol compiler called Cobol-IT. The approach of "OpenCobol" is to translate using a first compiler, an input Cobol source program into an output program which is a "C" program, and then to use a second compiler, a "C" compiler, to compile the "C" program to produce an executable machine program. "C" compilers are widely available on almost every significant computing platform, and so the use of a "C" compiler as the mechanism for producing machine code for each hardware platform makes the overall approach quite portable, and may also provide for a higher level of optimization of generated machine code.

It should be noted that the "C" code produced by the OpenCobol compiler is not very "readable" by a programmer since the "C" code is at a very low level and thus may not use variable names that are related to variable names included in the original Cobol source.

It is desirable to provide a Cobol compiler that produces code that is portable to various hardware platforms, and to produce code that is reliable. It is also desirable to allow for modifying Cobol programs in a way that allows for enhancing or modifying existing Cobol programs, possibly without requiring that the source code for those changes be in the Cobol language itself.

Programmers often prefer one computer language over another and some computer languages may be "better" than other languages for implementing certain algorithms or types of programming. It may also be true that a programmer may simply have a more thorough understanding of one language over another, and therefore can work more efficiently in one language rather than another.

BRIEF SUMMARY OF THE INVENTION

It would be therefore an advantage to those Cobol programmers desiring to change or alter Cobol programs, and programmers in general to provide a Cobol compiler that allows for a Cobol program to include program code written in another high level general purpose computer programming language other than the Cobol language. It would be of specific advantage to provide a method or system that allows for mixing the general purpose programming languages of C and/or C++ with Cobol, since the language C/C++ is probably the most popular and widely supported programming language of all programming languages and comes with a full set of features widely supported by both commercial compilers and open source compilers. Also, the same approach would be advantageous in use of the JAVA high level programming language instead of C++. The approach utilized by the present invention would be applicable to JAVA, FORTRAN or other high level programming languages in place of the approach utilizing Cobol and C++ discussed below.

It would be of further advantage if support for a single source file or module of a computer program that includes a mixture of high level language Cobol programming statements, and high level language programming statements for a second high level language were provided in conjunction with providing a method of compiling said single source file with a compiler that was not required to actually recognize and completely process the second programming language. That is, the ability to utilize an already existing Cobol compiler that translates Cobol to a second language such as C++, with that compiler enhanced with a reasonably small amount of development effort to continue compiling (translating) the "Cobol" as it does already, and then with the ability to also recognize one or more lines of C++ (for example) embedded within the traditional Cobol statements as code that is simply passed through the enhanced Cobol compiler and written to the output file in almost their original form, and in a location within the file that is in the same relative location or order existing between the original Cobol statements and the C++ statements.

For example, a single file that contains Cobol statements Cobol-1, and Cobol-2, followed by C++ programming statements (declarations or program flow or equations) CPP-1, and CPP-2, and the further Cobol statements Cobol-3 and Cobol-4, would be compiled/translated to a series of C++ statements that are: Cobol-1 translated to C++, Cobol-2 translated to C++, CPP-1 "copied", CPP-2 "copied", Cobol-3 translated to C++, and Cobol-4 translated to C++. The word "copied" is placed in quotation marks to note that the C++ statements may not be just copied, but require some slight amount of processing to translate variable names in the C++ code into variable names that will properly interact with the surrounding Cobol statements. This is done so that the programmer is be able to use Cobol style variable naming conventions common to both the Cobol and the C++ code. This is an optional improvement to the method of the present invention.

One exemplary embodiment of the present invention capitalizes on the popularity and widespread support of C/C++ by utilizing a Cobol compiler that already translates program statements from Cobol into C++ and which further includes support for translating C/C++ program statements embedded in the Cobol source into C/C++ statements that will communicate/"work" with the surrounding Cobol statements. The method of the present invention utilizes a two-stage compilation process, wherein the first stage performs a translation of Cobol statements into a second language such as "C++" and then a second stage performs a compilation of the intermediate C++ code into an object or executable. Benefit is gained by providing in the first stage translation process the capability for supporting description contained in the first source program (i.e. potentially originally all Cobol) of program functionality in both Cobol and in a second, possibly more modern, language. That is, it is advantage for programmers to be able to take an existing Cobol program and to insert "C" or "C++" (or other high level programming language statements) into the Cobol program and to still have it compile, execute, and during such execution to provide for interaction between the Cobol code, and the "C/C++" code.

"High level language" or "high level programming language" is meant to be interpreted as describing a computer programming language that is above the machine level, and above the assembly level. That is, it is a programming language that is describing a computer program in a form above the level of specifying actions by specification of instructions at the hardware level. It is to be noted that Java byte code is not at the level or in this case to be interpreted as a high level language. Java byte code would be considered at a machine level specification. Examples of high level programming languages that are well known are C, C++, Java, Cobol, Fortran. Other high level, but less common, languages are well known to those familiar with the art of computer programming.

The method of the present invention for supporting two languages within a single program and contained in a single input source program file or module has a further advantage in providing the capability for a Cobol program to interface directly in a second language such as by having C++ directly interface with libraries in the second language. This is of particular advantage when a call interface to the second language is not provided as part of the Cobol language for a particular Cobol compiler. For example, Cobol compilers typically provide for a direct call to a "C" program, but do not provide directly for a call to a "C++" program.

With C++ being perhaps one of the most flexible and powerful computer languages, there is particular benefit to be gained in allowing for a mix of Cobol source code and C++ source code within a single file of a computer program that may be mostly written in the Cobol language, or which may have been originally written entirely in Cobol.

Even for programming that is entirely new, there is still an advantage to providing for both Cobol and C++ descriptions within a single source program file. For example, declarations of structures in the Cobol language are much more easily expressed and easily read by another programmer than declarations of similar structures in "C", and especially in "C++".

According to a specific embodiment of the present invention, an existing Cobol program can be enhanced by allowing for inclusion of source code written in another, optionally more modern language, while still maintaining or keeping the known logical correctness and reliability of the original Cobol program, and also while keeping the output code "portable". That is, for example, changes can be made in a Cobol program by adding new "C++" code that calls newly available functions in new "C++" libraries, without changing the well known and functioning flow of program logic captured in the original Cobol program.

This approach provides advantage also in that it is less risky than using an approach which involves translating an original Cobol program by hand into a second language and then trying to improve or change that new code in the second language. "Cobol" is a complex language that is not easily translated by hand into another language, especially into a form that is easily readable by a person looking at the generated C code.

Providing, in a compiler, the capability for handling a mix of high level languages in a single source program however is not straightforward. Rules for naming variables, data types and many other programming constructs are different in different programming languages. This is particularly true of Cobol in that it is quite different in its support of decimal data, and in character strings in comparison to languages such as Fortran, C, C++, or JAVA.

Here it is important to distinguish between a "high level" language, and "assembly" language. Assembly language is a "low level" language which provides access directly to the hardware or machine level instructions. High level constructs such as "DO loops" or "FOR loops" or "IF THEN ELSE" statements are not typically provided or included in a machine or assembly language. Assembly language is machine dependent and is not portable. "Compilation" of assembly source code is typically done by an "assembler" which is specific to the hardware platform on which the code is to be executed, and not by a general purpose compiler used for a high level language. In the prior art, some compilers for some languages have provided for "inline" assembly language, which provides for insertion in the middle of a "C" program, for example, of assembly level machine code. This has been provided for reasons such as improved performance, or direct access to machine level instructions. Thus, assembly language is machine dependent, compiler dependent, and source code dependent and therefore is not at all portable or reliable. Also, levels of compiler optimization can have a direct effect on whether certain sequences of assembly level instructions will work at all, to perform a desired function, especially in relation to high level code which precedes or follows the assembly level instructions.

A method for providing for a mix of two general purpose high level languages within a single source program provides potential significant advantages over the prior art, and is one feature or important aspect of the present invention.

A compiler implementation approach that provides for a mix of two high level language in a compiler that is portable is another further aspect or improvement of the present invention (i.e. portable meaning not machine dependent), with portability and a higher level of optimization being achieved through use of a two-stage compilation process. The widespread support of C and C++ programming languages on almost all types of computing hardware provides portability and is an advantage for a programmer utilizing the method of the present invention. It provides further advantage in that the C++ (and Java) languages are widely used and as a result standard compilers for these languages tend to be highly optimized and kept current by compiler developers/manufacturers.

An example of this approach implemented in an illustrated embodiment of the present invention utilizes a special Cobol compilation process implemented as a two stage compilation process. The first stage of the compilation process utilizes a special Cobol compiler that provides for the translation of Cobol statements from an original source program file into an intermediate C++ source program file. The second stage of the compilation process is performed by a standard C++ compiler that compiles the intermediate C++ source program file into a machine object or executable file. The first stage compiler further includes a method or feature or capability for making it a "special compiler" that translates Cobol source code from the source program file, and also provides for the transport (i.e. copying and/or slight translation) of any C/C++ code contained in the source program file into C++ code in the output C++ source program file.

That is, the Cobol code mixed with C++ program code in the original source program file is processed or translated by a special first stage compiler into an intermediate source file that is C++ code, with some of the code in the intermediate C++ source file coming from the translation of Cobol statements read from the original source program file or module, and other parts of the code coming from a simple "transport" of C++ code embedded in the original source program file into the intermediate source file.

It is noted and emphasized that the present invention capitalizes on the mixing of two high level languages in a single source module when one of the two languages is the same as the intermediate language of translation. That is, in the above example, Cobol is mixed with C++, and C++ is the language that the first stage special compiler translates "to" in the first stage of compilation. Since the C++ code in the source module is already C++, which is the language of the output, the C++ code can be simply copied into the output file in the same relative location as it appears in the source. It may also be optionally advantageous to provide some "slight" translation of C++ variable names in order to be consistent in translation of the Cobol source code variable names to C++. That is for example, the method of the present invention operates to apply the same rules for translation of any variable names in the C++ as those that are applied to Cobol source.

It is a further optional improvement or aspect of the present invention to provide that the "translation" of the C++ code not be just a simple copying of the C++ source code, but also to encompass optional steps for enhancing convenience of use such as, for example, a translation of variable names from a form that meets or confirms to Cobol style naming rules into a form that meets or conforms to C++ style variable naming rules. It should be noted that the C++ source code in the original program file in which Cobol and C++ is mixed doesn't require much, if any, "translation". C++ is simply being largely copied from the source file into the output file (intermediated file). However, there may be some further advantage to provide for a small level of "translation" to provide a programmer with better or enhanced compatibility between the code in two languages, the C++ and the Cobol. An example of such compatibility is in the handling of variables names in C++ and Cobol. The requirements for naming variables in Cobol are somewhat different than those for C++, and so the translation of Cobol to C++ necessarily must include at least some changing of the variable names, preferably a straightforward and defined algorithm for this is used so that the variable names in the C++ are "readable" and will be viewed by the programmer as being the same basic variable. In one illustrated embodiment, this means translating, for example, "hyphen" characters which are allowed in Cobol variable names into "underscores" in C++, and to further translate other characters or sequences of characters such as "$" into characters or sequences of characters that are legal in "C++". In this manner, "Cobol" variable names can be included in the C++ code such that the code is made easier to read, understand and modify. The rules followed in this translation are the same rules followed by the special first stage compiler as the rules followed for translation of any Cobol variable names from Cobol to C++. Thus, as an optional feature of the method of the present invention, is that a convention for translation be defined for Cobol to C++ and then same convention is then utilized for the translation of variable names found in the embedded C++ code. This is "almost" a copying of the C++ code, but with just enough "translation" to provide for this type of inter-language compatibility.

It is a further advantage or aspect of the present invention to provide a method which supports the OpenMP pragma language in addition to providing support for two programming languages included in a single source programming file. As discussed in greater detail in the referenced parent application, the OpenMP standard for parallel processing in C/C++ or Fortran programs and already provides directives specifically designed to accommodate the languages of C/C++ and Fortran. For more information as to the use of such programs, reference should be made to Applicants' parent application. In one exemplary embodiment, the method of the present invention supports programming statements contained in a single original source file which include a mix of Cobol, C or C++, and OpenMP programming pragmas as programming or control statements. That is, for example, a single source program file could include 100 lines of Cobol source statements, 20 lines of C++ code referencing variables from the prior Cobol statements or declarations, then an OpenMP pragma, and then further Cobol or embedded C++ code. The method of the present invention using a special first stage compiler, translates the Cobol statements contained in the original source program file into C++ statements contained in a translated output file with variable names in the C++ statements being directly related or relatable to the original Cobol variable names. The method would further perform the step of "copying" or translating embedded C++ statements into C++ code. The "copy" operation or step could be either a direct copy or could optionally allow for expression of variable names in the C++ code in the manner of Cobol variable names. The method step would also "copy" or translate any OpenMP pragmas contained in the original source program file in a manner similar to that used in the case of the C++ statements. The order of translated statements would be or appear in the same, or roughly the same order as statements contained in the original source program file. That is, the 100 Cobol statements would be translated into C++ statements in the translated output file, followed by the copied or slightly translated C++ statements, with the OpenMP pragmas appearing in the same relative locations as they appeared in the original source program file. That is, the ordering of statements in the translated output program file is the same or roughly the same as the statements contained in the original source program file, whether the original statements were written in Cobol, C or C++, or as OpenMP pragmas.

Another general purpose programming language with widespread support for many hardware platforms is Java. In another embodiment, the method of the present invention provides for a first stage compiler/translator that translates Cobol statements in an original source program file into Java statements contained in a translated output file. The Java statements contained in the original source program file are copied or slightly translated into Java statements contained in the translated output file. The term "slightly translated" is to be interpreted to include allowing for variable names in the Java statements to be expressed in the same way or manner as Cobol variable names with the "slight" translation including a translation of the variable names in the same manner or way as Cobol variable names in Cobol statements are translated into variable names that meet Java programming rules. Support for parallelization pragmas and Java parallelization or thread support is also provided by an interpretation of pragmas or commands contained in the original source program file in the same way or manner as they would be interpreted by a Java compiler. The translated output file is then compiled by a standard Java compiler to produce executable program files that function in a manner described or defined in the mixed language original source program file.

Thus, in this manner, the compilation processing by the method of the present invention, is able to produce an executable (or executable program) that is based upon the input Cobol program, the executable program providing parallelism by utilizing multiple threads of processing during execution, and further providing for an original a mixed language source program file. Because of multi-threaded execution or processing, the executable program is typically capable of running observably faster than a program run with no parallelism (single thread). That is, the rate of observable work completed in a given time will typically be improved (i.e. be made greater) when the executable program is processed by multiple processing threads, in comparison to a standard approach in which the executable program (or at least the main part of the executable program) is processed by only one thread. In some cases, the rate of work being completed can be seen to increase at a rate related to being almost directly proportional to the number of threads used. This is discussed in greater detail in the referenced parent application.

The support of C++ statements contained in the original source program file will also provide for performance improvements because the C++ language is generally supported by compilers having a higher level of optimization than other languages, and in particular, as for example, in the use of C++ on Intel Xeon hardware platform which is popular and important. In particular, both the GNU (open source) and the Intel compilers are highly optimized for Intel Xeon based hardware.

Also, according to another aspect of the method of the present invention, the compiler of a first stage includes the capability to read and process original program statements in Cobol and in C++, and further optionally allows for the processing of OpenMP statements, and thereby produces during a first translation step, an intermediate program in a second computer program language which is for an example, a C++ program file. The intermediate program is then translated by the first stage in a manner organized or designed to accommodate and include within the intermediate program, parallelization directives that are in form suitable to be processed by a selected second compiler included in a second stage of compilation; the second compiler being specifically selected to provide support for parallelization directives such as the exemplary OpenMP standard. The intermediate program file further includes C++ statements copied in their relative locations from the original source program file into related locations in the intermediate program file. The first stage compiler further includes a provision or capability for passing OpenMP pragmas or directives through to the second stage. The second stage second compiler is utilized to build the executable program which optionally provides for processing by multiple threads of operations during its execution based on the OpenMP pragmas or directives, while also being able to include or retain the functionality of both the original Cobol statements and the original C++ programs contained in the original program source file. The organization, ordering, syntax, and style of the components of the intermediate program and the optional parallelization directives which are generated by the first stage of the two stage compilation processing are constrained and designed so as to be compatible and in a form suitable for processing by the second stage (standard) compiler.

The method(s) and approach of the present invention have the potential or opportunity to provide the following several specific improvements and advantages over the above discussed approaches of the prior art:

1) Allowing for programming in a single file using both Cobol program statements, Cobol declarations, and C++ procedural program statements;

2) Providing for declarations using a Cobol style of structures and then providing references to those structures from C++ program statements;

3) Achieving an option of parallelism for a program written using a mix or mixture of C++ and Cobol statements without requiring the availability of a compiler(s) that provide support for parallelism directives, compilation of C++, and compilation of Cobol as input languages obtained from a single input file;

4) Achieving better performance than would otherwise be achieved by developing a singular new compiler or compilers designed specifically for the purpose of supporting parallelism (through multiple threads), C++, and Cobol contained in a single source program; and, 5) Providing for continued benefit from new or further improvements in compiler technology, evolving hardware support and in general maintenance of a high quality compiler with reduced maintenance costs and less initial investment in compiler development.

The above improvements and advantages are achieved through use of the two-step (or two phase, or two stage) compilation processing methodology or approach of the present invention It will be appreciated that it is not just a lack of the availability of any general compiler for achieving parallelism in the Cobol language that provides an improvement over the prior art. The approach or methodology used in the present invention also satisfies a need for performance, a desire for broad machine support, good debug tools, measurement and analysis tools and other similar advantages which are offered by using commercial vendors tools having these features provided in best form for "important" modern languages, such as, C/C++ and Fortran. With application of the method of present invention, some or all of these advantages are provided for a program written in Cobol while also providing for parallelization utilizing multiple threads of processing during execution of the resulting executable program, and while allowing for programming in both C++ and Cobol languages obtained from within a single source program file.

Because of close and intimate knowledge of the workings of their own company's hardware and software, and because of partnerships with other major commercial vendors, companies such as Microsoft Corporation or Intel Corporation can develop compilers which provide for better optimization and more features than what is likely to be provided by individual developers or developers in smaller or less connected companies. For example, utilizing a major compiler such as a C/C++ compiler from Intel Corporation as a second compiler provides the benefits of good optimization and continued improvement as hardware changes and evolves. According to the teachings of the present invention, using the special compiler in a first phase to perform a special translation of Cobol as for example which includes capability for expressing and describing parallelism within a Cobol program, provides for that parallelism in the first phase of compilation processing, and relies on use of an already existing compiler from a major vendor in a second phase of compilation processing and takes advantage of the features of both compilers.

BRIEF DESCRIPTION OF THE SEVERAL VIEWS OF THE DRAWINGS

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawings in which:

DETAILED DESCRIPTION OF THE INVENTION

The present invention provides a method, a system and program product for performing the compilation of an original mixed language Cobol/C++ source program, in which the method provides for building an executable program utilizing a two stage compilation process or system that provides reduced development effort and potential for improved performance in providing support for the compilation of a source program file that comprises a mixture of programming statements in the Cobol programming language, and programming statements in C++, the Cobol and the C++ programming statements optionally referencing the same program variables, and further optionally allowing for inclusion of parallel programming pragmas so as to enable execution of multiple threads when the executable generated by the method of the present invention is run on a computer system.

Figure 1:
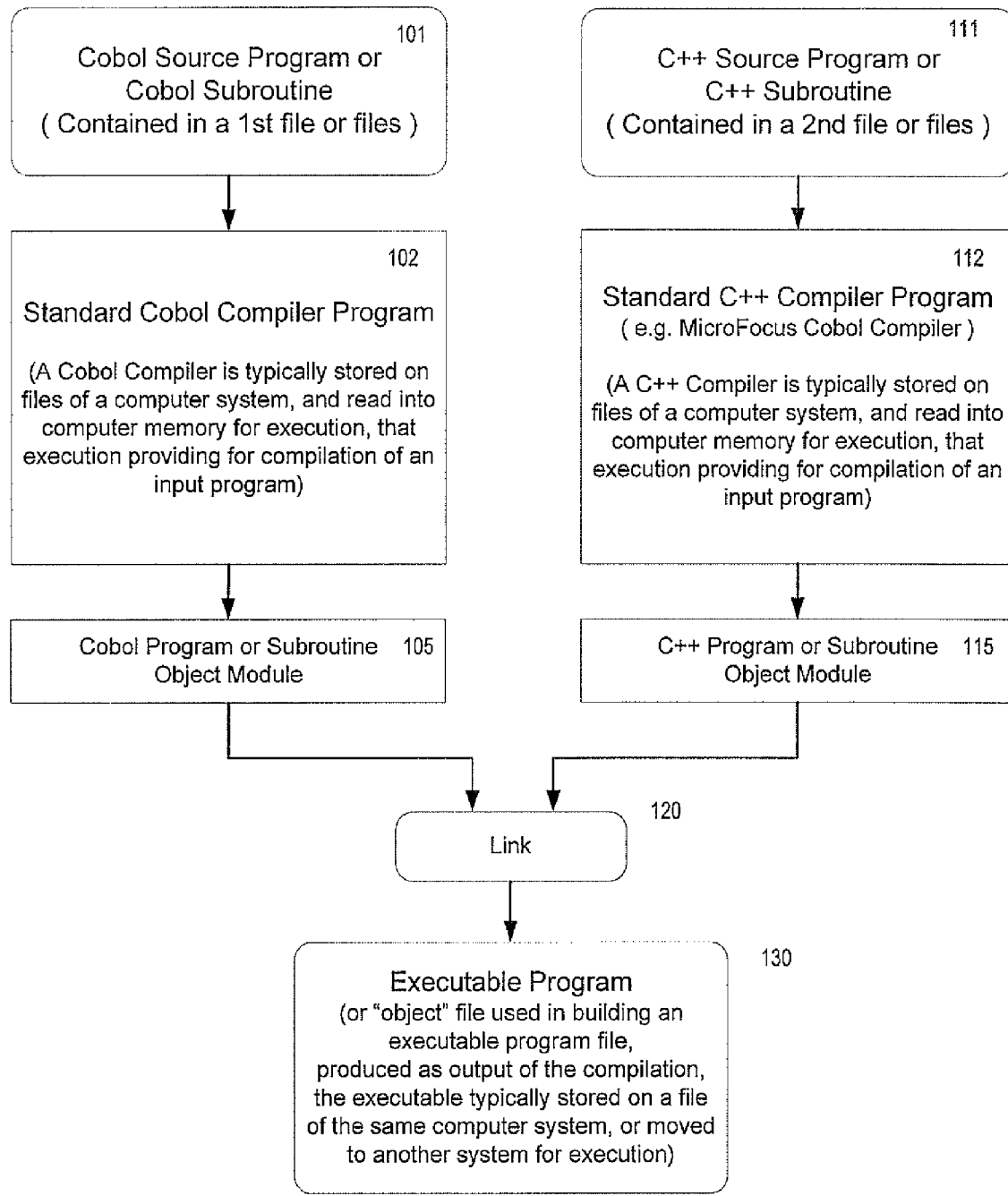
FIG. 1 illustrates a compilation methodology of the prior art in which a Cobol source program and a separate C++ source program, each describing a part of overall program functionality are compiled separately, and then linked to produce a program executable.

FIG. 1 illustrates a compilation methodology of the prior art in which overall program functionality is defined by two programming languages. In this example of the prior art, the program pieces if a program 101 described or written in Cobol are described or contained in one or more Cobol source files, and the program pieces of a program 110 described or written in C++ are described or contained in a second set of one or more C++ source files. The Cobol source program 101 stored within a first file or set of files is compiled with a standard Cobol Compiler Program 102 with the output from the Cobol compiler generating a first object module 105. In a like manner, using a separate and different compiler 112, a separate C++ source program 111 is compiled by the standard C++ Compiler in turn generating a second object module 115. The object modules 105 and 115 are then linked by a standard linking program 120 to generate an executable program 130. This executable program can then be written into memory of a computer system (either the same one that performed the compilation(s) or another computer system) and executed (or "run"). The functionality of the executable is defined by the programming of both the Cobol source code 101 and the C++ source code 111.

Figure 2:
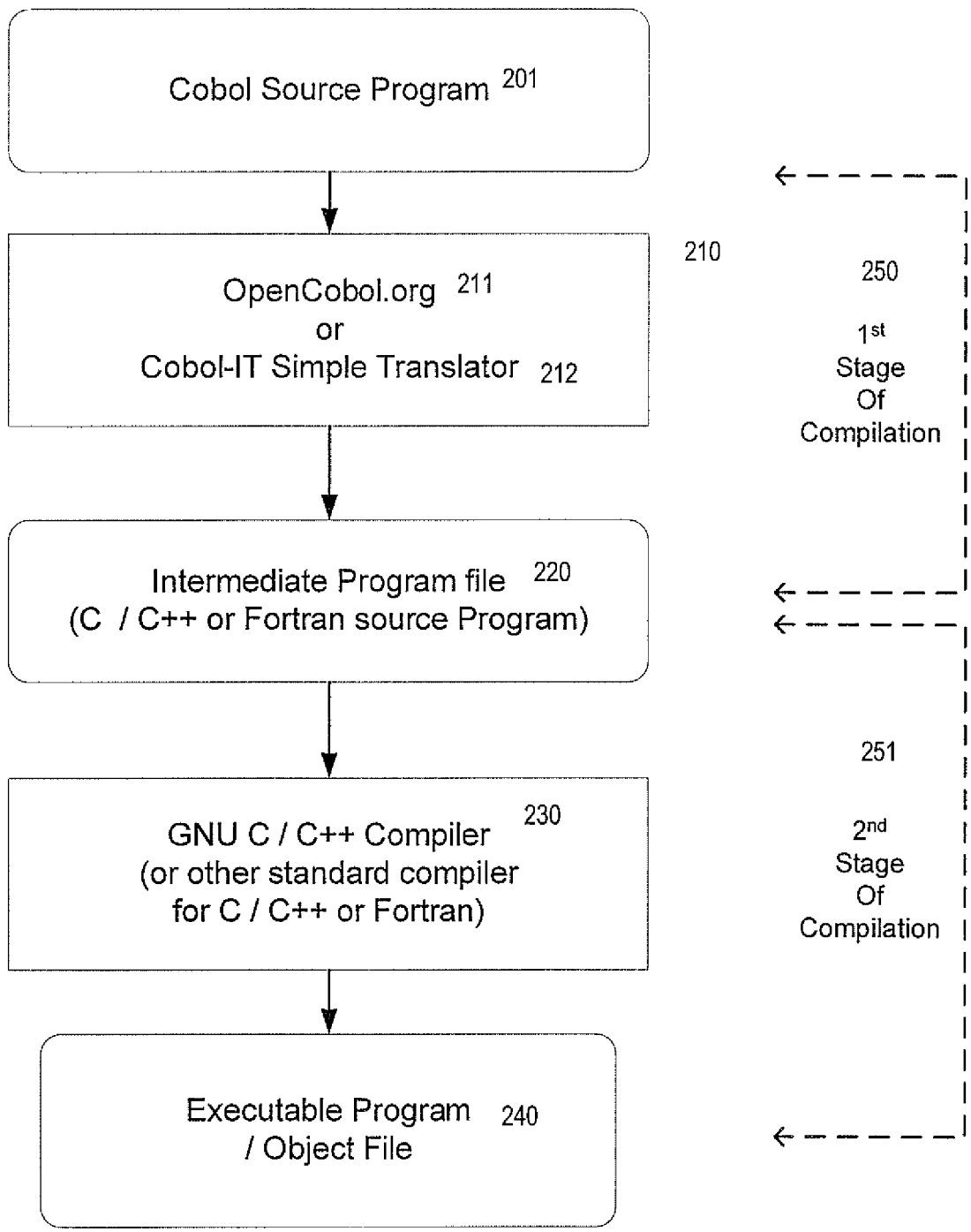
FIG. 2 provides illustration of a prior art two stage compilation methodology or system in which a Cobol source program is translated into a C++ program contained in an intermediate program file, and then the intermediate C++ program is compiled by a standard C++ compiler into an executable program or object module.

FIG. 2 is an illustration of a prior art two stage compilation methodology in which a Cobol source program 201 is translated by a compiler/translator 211 into an intermediate C++ program 220 contained in an intermediate program file, and then the intermediate C++ program 220 is read from the intermediate program file and compiled by a standard C++ compiler 230 into an executable program or object module 240. The first stage of compilation 250 performs the translation of the Cobol source program into the intermediate C++ program. The second stage of compilation 251 performs the compilation of the intermediate C++ program to produce an executable program of object file 240.

Figure 3:
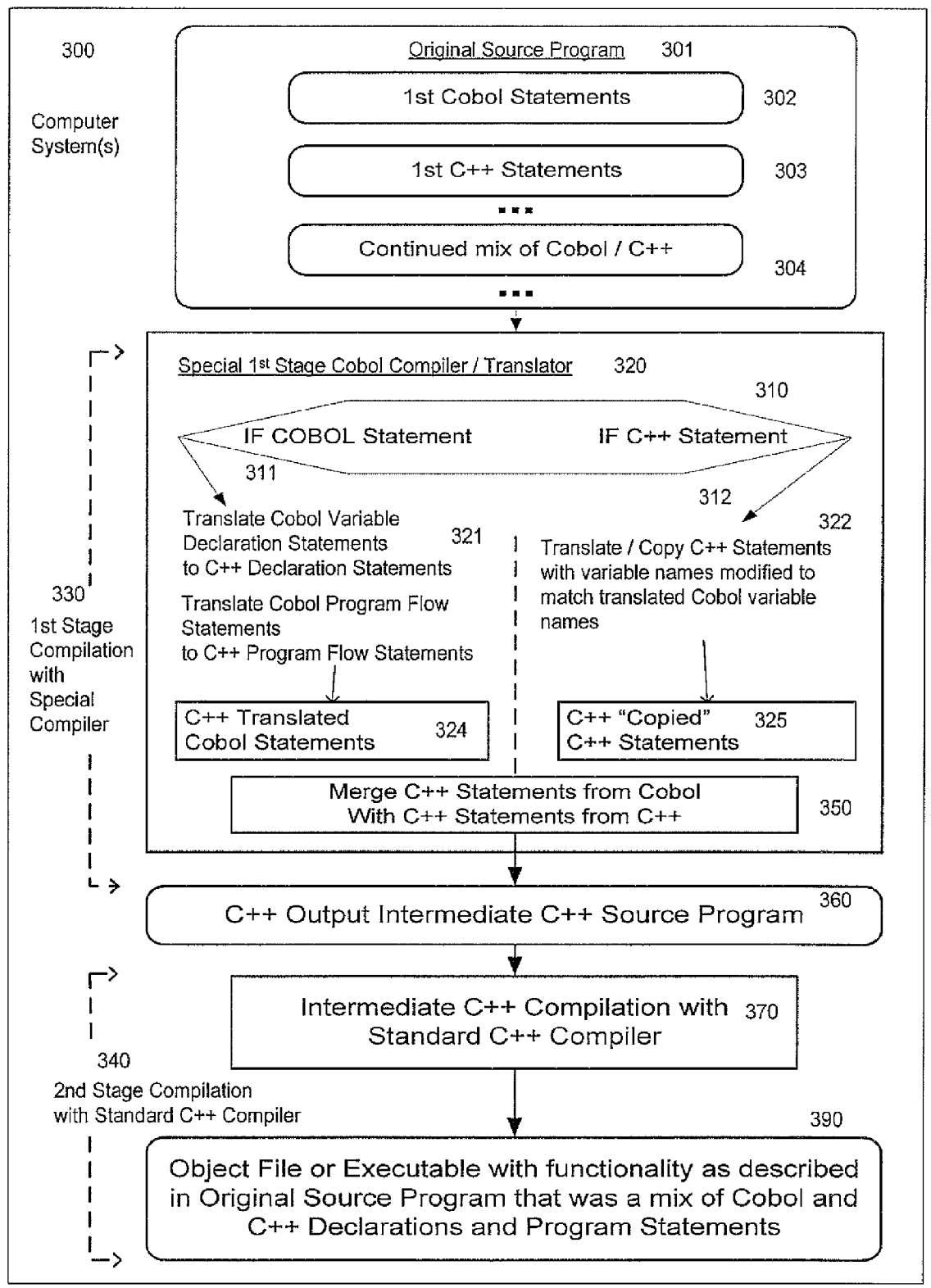
FIG. 3 provides illustration of one embodiment of a computer system that performs the processing methodology or method of the present invention in which a source program file comprising a mix or mixture of Cobol and C++ programming declarations and statements are translated by a special first compiler/translator stage, into an intermediate program file in C++ and then in a second stage of compilation, the intermediate program is compiled by a standard C++ compiler to produce an executable or executable program object.

FIG. 3 is an illustration of one embodiment of a computer system 300 that performs the compilation processing of the method and system of the present invention in which an original source program or subroutine 301, having one or a single program module, that is one subroutine or one main program. As shown, the single original source program 301 comprises a mix of Cobol programming declarations and statements 302 and C++ programming declarations and statements 303 within that one module (one single subroutine or one main program). The one programming module 301 containing a mix or mixture of Cobol source code and C++ source code stored on non-transitory storage media is read by a special first compiler 320 which generates an intermediate program in the C++ programming language 360 that is typically written into an intermediate file. Then, in a second stage of compilation, the intermediate C++ program 360 is compiled with a standard C++ compiler 370 which generates an executable or executable program object 380. The details of internal tables and parsing/generating by compilers are well known in the art and the special first ($1^{st}$) stage compiler could be implemented in many ways. It is to be noted that term "computer system" is to be interpreted to include one or more computer systems. That is, for example, the first stage compilation could be performed on a first computer and the second stage compilation could be performed on a second computer and execution of the executable could be performed on either the first, the second, or a third computer. The interpretation of the term computer system is meant to be general as in terms of including arrangements allowing files and computing resources to be connected in many ways as is well known in the art, or that could be devised by one knowledgeable in the art. One example of a computer system that can be used is described in Applicants referenced parent application.

In greater detail, the system of FIG. 3 illustrates a method for generating, on the computer system 300, an object program file or executable 390 from an original high level input source program 301 stored in one or more source program files on non-transitory storage media accessible by the computer system 300. The program executable 390, when executed by the computer system 300, functions in a manner described by the original high level input source program 301. The illustrated method comprises the steps of: A) accessing the source program files and reading the original high level source program 301, the original high level source program 301 comprising or containing a mix of both original high level Cobol source program statements 302 in the Cobol programming language and original high level C++ source program statements 303 in the C++ programming language, the original input high level Cobol source program statements including original Cobol variable declaration statements describing original Cobol variables with original Cobol variable names and associated Cobol data types and original Cobol program statements 302 and 304 specifying a part of the functionality of the original high level source program, and the original input high level C++ source programming statements 303 and 304 describing another part of the functionality of the original high level source program; B) first compiling/translating, in a first stage of compilation having an enhanced Cobol compiler/translator 320, the original high level input source program and generating as output an intermediate C++ source program file 360, the output intermediate C++ source program file comprising: 1) a first plurality of output C++ statements 324, in C++ programming language, with functionality directly related to and specified by the original input high level Cobol source program statements, and, 2) a second plurality of output C++ statements 325, in C++ programming language, with functionality being directly related to and specified by the original input high level C++ source program statements, the first and second plurality of output C++ statements being merged or organized into an order as indicated by reference numeral 350 which is directly related to the relative ordering of the original high level Cobol source program statements and the original high level C++ source program statements in the original high level source program; and, C) second compiling in a second stage of compilation 340, having a standard C++ compiler 370, the intermediate C++ source program file output 360 from step B) and generating as output, the object program file or executable 390 which when executed by the computer system 300 functions in the manner described by the original high level source program 301.

Figure 4:
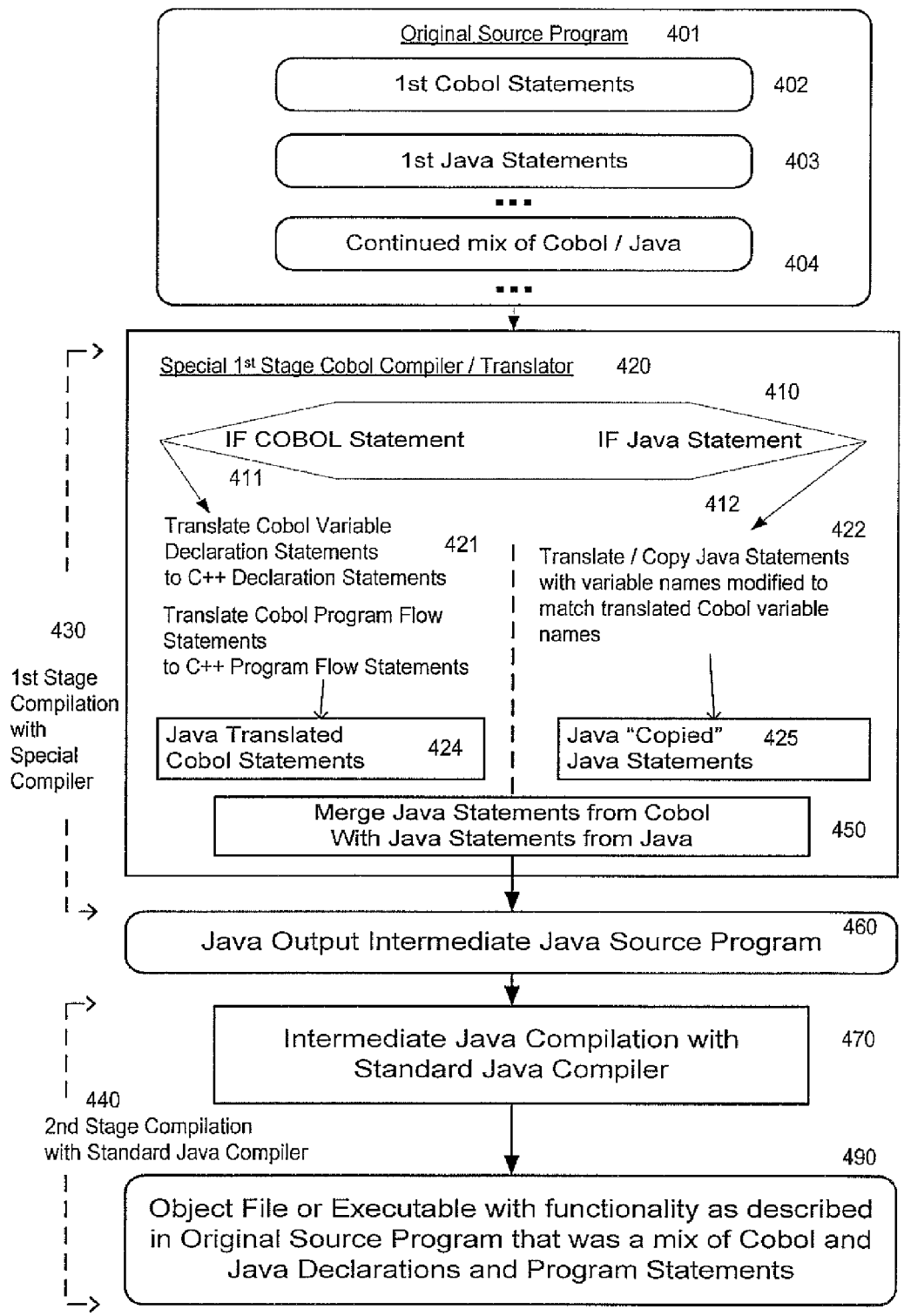
FIG. 4 provides illustration of another embodiment of a computer system that performs the processing methodology or method of the present invention in which a source program file comprising a mix of Cobol and Java programming declarations and statements are translated by a special first compiler/translator stage into an intermediate program file in Java and then in a second stage of compilation, the intermediate program is compiled by a standard Java compiler to produce an executable or executable program object; and, FIG. 5 provides an illustration of still another embodiment of the computer system that performs the processing methodology or method of the present invention in which a source program comprising a mix of Cobol statements, C++ statements and OpenMP pragmas that are first compiled by a first stage into an intermediate program containing C++ statements and OpenMP C++ pragmas, followed by compilation by a second standard C++ compiler stage having OpenMP support to produce a program executable or object module.

FIG. 4 provides illustration of another embodiment of the present invention in which an original source program or subroutine 401 included in one program module, that is one subroutine or one main program, comprises a mix of Cobol programming declarations and statements 402 and JAVA programming declarations and statements 403 within that one program module (one single subroutine or one main program). The one program module 401 containing a mix of Cobol source code and JAVA source code is read by a first stage special first compiler 420 that generates an intermediate program in the JAVA programming language 460 which is typically written into an intermediate file. These overall steps are marked by reference numeral 430 as a 1st stage compilation having a special compiler. Then, in a second stage of compilation, the intermediate JAVA program 460 is compiled with a standard JAVA compiler 470 to generate an executable or executable program object 480. As discussed above, the details of internal tables and parsing/generating by compilers are well known in the art and the special $1^{st}$ stage compiler could be implemented in many ways.

Figure 5:
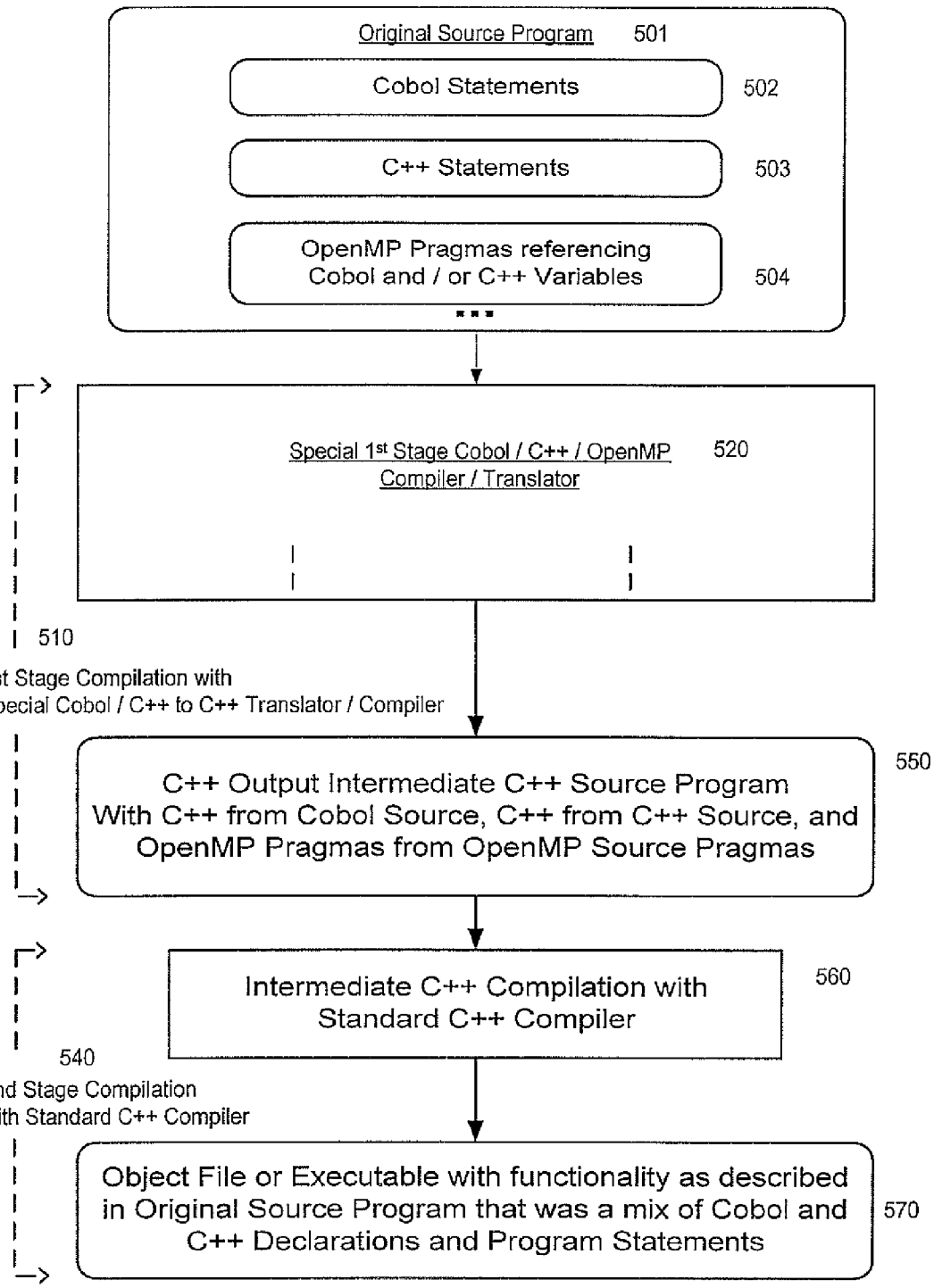

FIG. 5 is an illustration of still another embodiment of a computer system 500 that performs the compilation processing of the present invention in which a single source program 501 comprising a mix of Cobol statements and declarations 502, C++ statements and declarations 503, and parallelization directives 504, defined using OpenMP pragmas, are compiled by a special compiler 520 into an intermediate program 550 that comprises C++ statements translated from Cobol statements, C++ statements copied/translated from C++ statements, and OpenMP C++ pragmas generated by the special compiler from the parallelization directives 504. The intermediate program 550 containing the C++ statements and OpenMP pragmas is then compiled by a standard C++ compiler 560 having OpenMP support capabilities to produce a program executable or object module 570. In FIG. 5, the first overall stage of compilation is designated by the reference numeral 510, and the second overall stage of compilation is designated by the reference numeral 540, and the steps performed by the two stages together illustrate the overall two-step compilation method of the present invention.

Thus, while the principles of the invention have now been made clear and described relative to a number of illustrative embodiments or implementations, it will be immediately obvious to those skilled in the art the many modifications or adaptations which can be made without departing from those principles. While the invention has been shown and described with reference to specific illustrated embodiments, it should be understood by those skilled in the art that various changes in form and detail may be made such implementations without departing from the spirit and scope of the invention as defined by the following claims.

Having described the preferred embodiments of the invention, it will now become apparent to one of skill in the arts that other embodiments or implementations incorporating the teachings of the present invention may be used. Accordingly, these embodiments should not be limited to the disclosed embodiments or implementations but rather should be limited only by the spirit and scope of the following claims.

What is claimed is:

1. A method of generating on a computer system, an object program file or executable from an original high level input source program stored in one or more source program files on non-transitory storage media accessible by the computer system, the program executable, when executed, functioning in a manner described by the original high level input source program, the method comprising the steps of:
   A) accessing the source program files and reading the original high level source program, the original high level source program comprising a mix of both original high level Cobol source program statements in Cobol programming language and original high level C++ source program statements in C++ programming language, the original input high level Cobol source program statements including original Cobol variable declaration statements describing original Cobol variables using original Cobol variable names and associated Cobol data types and the original Cobol program statements specifying a part of the functionality of the original high level source program, and the original input high level C++ source programming statements describing another part of the functionality of the original high level source program;
   B) the computer system in a first stage of compilation using an enhanced Cobol compiler/translator performing first compiling/translating of, the original high level input source program and generating as output, an intermediate C++ source program file comprising:
   1) a first plurality of output C++ statements, written in the C++ programming language, with functionality being directly related to and specified by the original input high level Cobol source program statements, and,
   2) a second plurality of output C++ statements, written in the C++ programming language, with functionality directly related to and specified by the original input high level C++ source program statements, the first and second plurality of output C++ statements being organized in an order directly related to a relative ordering of the original high level Cobol source program statements and the original high level C++ source program statements contained in the original high level source program;
   C) the computer system in a second stage of compilation using a standard C++ compiler performing a second compiling of, the intermediate C++ source program file output from step B) and generating as output, the object program file or executable that when executed by the computer system functioning in the manner described by the original high level source program.

2. The method of claim 1 wherein the original high level input source program further comprises original input source parallelization directives which are translated by the enhanced Cobol compiler/translator into OpenMP pragmas in the C++ programming language and the OpenMP pragmas in the intermediate C++ source program file also being organized in locations and in an order directly related to the locations and ordering of the original parallelization directives contained in the original high level source program relative to the ordering and locations of the original input high level Cobol source program statements and the original input high level C++ source program statements.

3. The method of claim 1 wherein step B) further includes the step of predictably translating the original Cobol variable declaration statements into intermediate variable declaration statements contained in the original input high level C++ source program, each intermediate variable declaration statement declaring and describing in the C++ programming language one or more intermediate program variables designated by intermediate variable names and types, each intermediate variable name being generated based directly upon the original Cobol variable names, and including the intermediate variable declaration statements contained in the generated intermediate computer program produced in step B).

4. The method of claim 3 wherein one or more of the intermediate variable names generated by the enhanced Cobol compiler/translator are referenced by at least one of the second plurality of output C++ statements.

5. The method of claim 2 wherein in step B) the generation of the intermediate parallelization directives by the enhanced Cobol compiler/translator further includes predictably translating any original Cobol variable names referenced by any of the original source parallelization directives in precisely a same manner as original Cobol variable names are predictably translated into C++ variable names in C++ variable declarations directly related to the original Cobol variable names in the original Cobol source program.

6. A program product comprising a non-transitory computer readable storage medium storing instructions of one or more control programs for generating a program executable from an original high level input source program, the program product instructions when executed performing the steps of generating, when run on a computer system, an object program file or executable from the original high level source program, the program executable, when executed, functioning in a manner described by the original high level source program, the program product control programs for performing the steps of:
   A) accessing the source program files and reading the original high level source program, the original high level source program comprising a mix of both original high level Cobol source program statements in Cobol programming language and original high level C++ source program statements in C++ programming language, the original input high level Cobol source program statements including original Cobol variable declaration statements describing original Cobol variables with original Cobol variable names and associated Cobol data types and original Cobol program statements specifying a part of the functionality of the original high level source program, and the original input high level C++ source programming statements describing another part of the functionality of the original high level source program;

B) first compiling/translating, in a first stage of compilation by an enhanced Cobol compiler/translator, the original high level input source program and generating as output an intermediate C++ source program file, the output intermediate C++ source program file comprising:

a) a first plurality of output C++ statements, in C++ programming language, having functionality directly related to and specified by the original input high level Cobol source program statements, and, b) a second plurality of output C++ statements, in C++ programming language, having functionality directly related to and specified by the original input high level C++ source program statements, the first and second plurality of output C++ statements being organized in an order directly related to relative ordering of the original high level Cobol source program statements and the original high level C++ source program statements in the original high level source program; and, C) second compiling in a second stage of compilation, by a standard C++ compiler, the intermediate C++ source program file output from step B) and generating as output the object program file or executable, the object program file or executable when executed functioning in the manner described by the original high level source program.

7. A method for generating, on a computer system, a multi-threaded program executable from an original source program, the multi-threaded program executable functioning in a manner described by the original source program, the original source program including original Cobol source program statements stored in one or more program files residing on the computer system, the original Cobol source program statements including: original Cobol variable declaration statements describing original Cobol variables with original Cobol variable names and associated Cobol data types, original Cobol program statements specifying functionality of the original Cobol source program, the original Cobol program statements including Cobol PERFORM statements, and, optional original Cobol comment statements, the method comprising the steps of A) the original source program which includes original Cobol source program statements further including a) original parallelization directives, and, b) programming statements in C++ programming language;

B) compiling a first time by a first compiler the original source program including the original source program Cobol statements, the original parallelization directives, and the programming statements in C++ programming language, the compiling by the first compiler being carried out by performing and generating as output, a directly related intermediate computer program in the C++ computer programming language which includes intermediate variable declaration statements and intermediate program statements directly related to the original Cobol variable declaration statements and the original Cobol program statements respectively, intermediate parallelization directives directly related to the original parallelization directives and C++ code from the programming statements in C++ programming language;

C) compiling with a second compiler, the intermediate computer program generated in step B, to generate as output, the multi-threaded program executable, the selected second compiler including support for program input in the C++ computer programming language, and further support for application of the intermediate parallelization directives.

* * * * *